Jan. 30, 1968
E. D. CANN
3,366,535
PROCESS FOR REGENERATING WASTE LIQUOR FOR REUSE
IN KRAFT PULPING OPERATION
Filed July 11, 1966
2 Sheets-Sheet 1
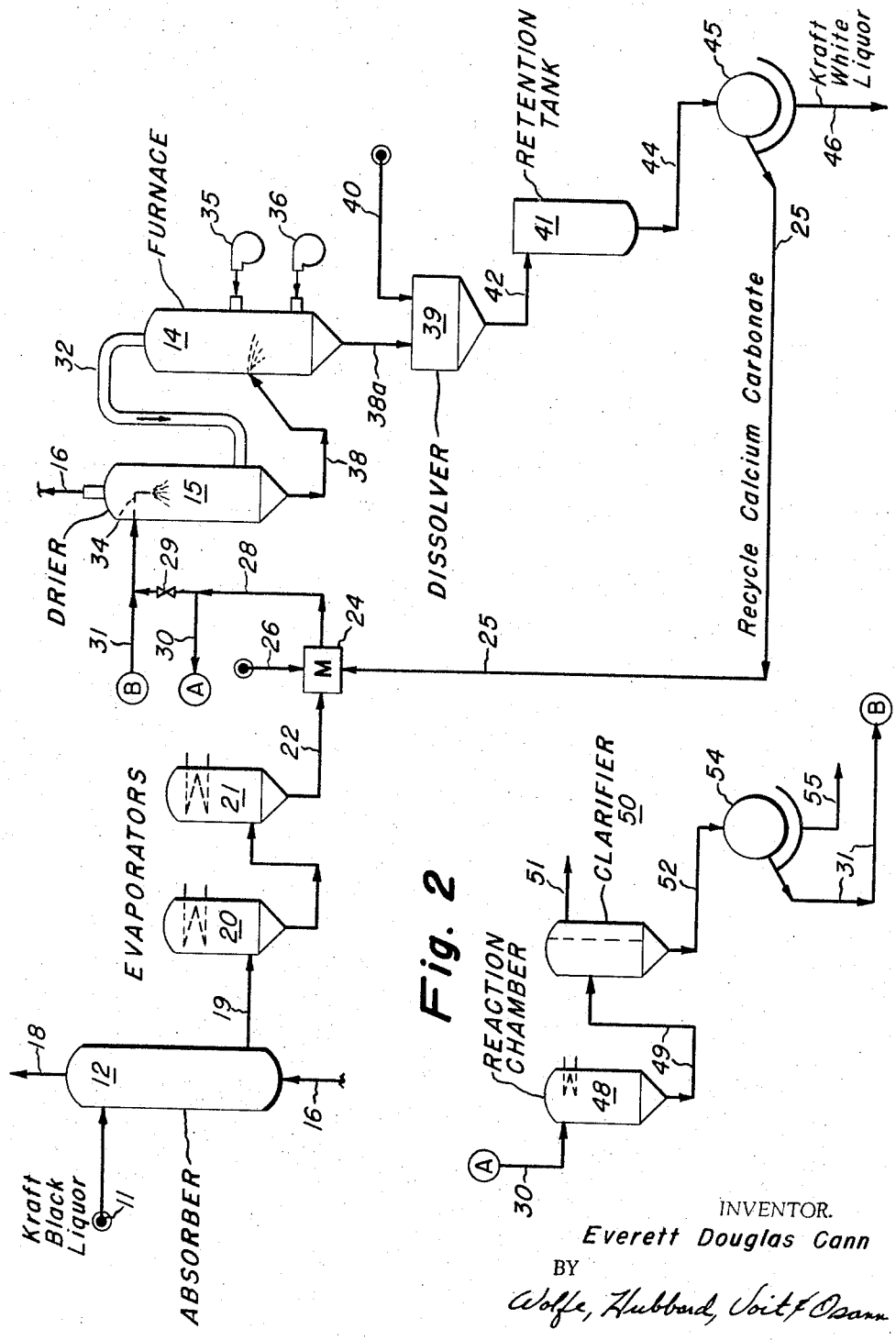
INVENTOR.
Everett Douglas Cann
BY
Wolfe, Hubbard, Voit & Osann
ATTORNEYS

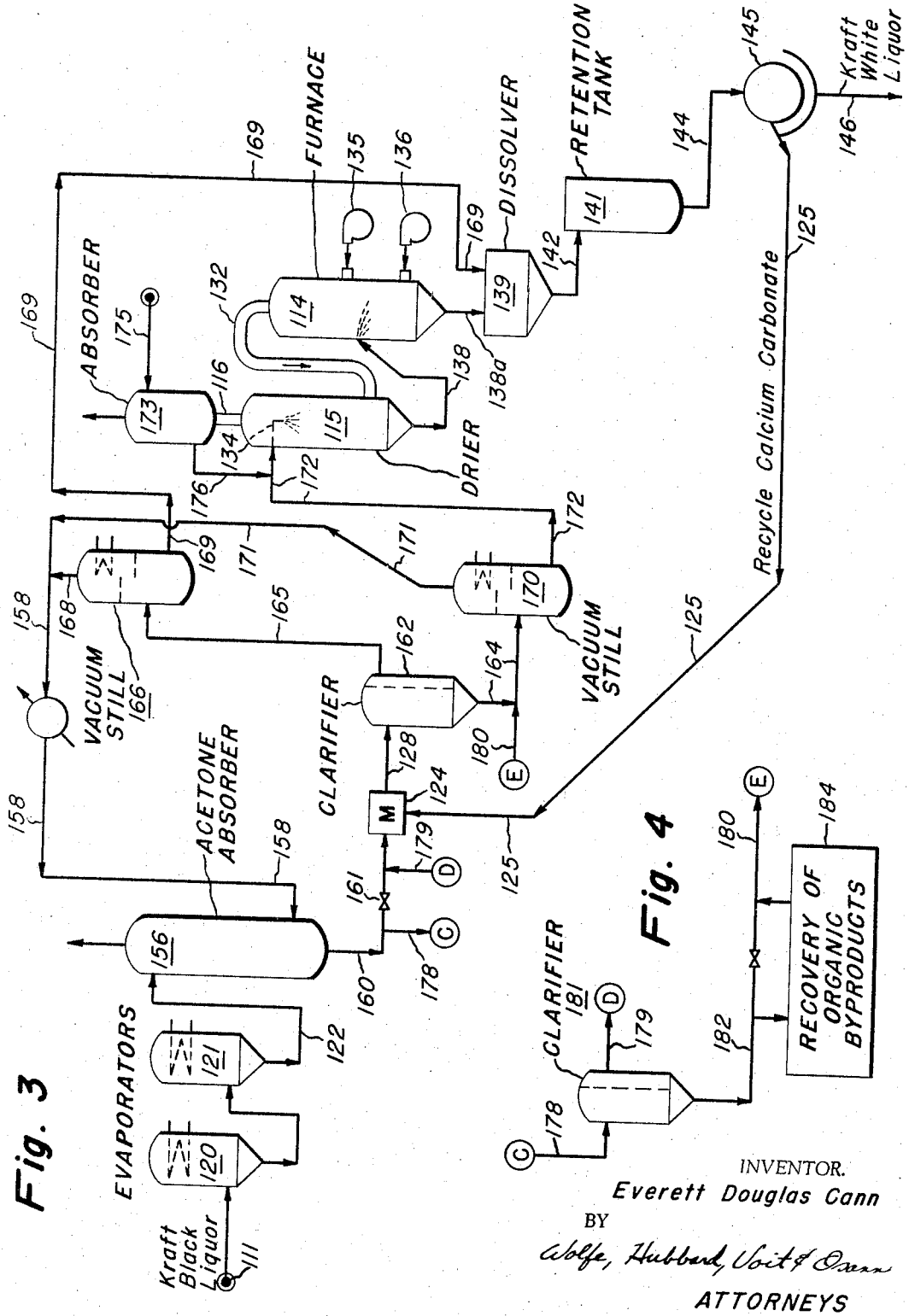

United States Patent Office 3,366,535
Patented Jan. 30, 1968

3,366,535
PROCESS FOR REGENERATING WASTE LIQUOR
FOR REUSE IN KRAFT PULPING OPERATION
Everett Douglas Cann, Freeport, Ill., assignor of
forty percent to William T. Neiman
Continuation-in-part of application Ser. No. 453,043,
May 4, 1965, which is a continuation-in-part of application Ser. No. 270,917, Apr. 5, 1963. This application July 11, 1966, Ser. No. 564,303
4 Claims. (Cl. 162—30)

ABSTRACT OF THE DISCLOSURE

Cooking chemicals are recovered from kraft pulping process waste liquors by: (1) adding to kraft black liquor a calcium compound (oxide, hydroxide, carbonate) sufficient not only to provide an alkaline pH and a separable complex but in sufficient excess to react with sodium carbonate formed on subsequent heating, (2) heating the complex to burn off organics, to reduce sodium sulfate to the sulfide, and to calcine calcium carbonate, (3) dispersing the resultant smelt in water to form sodium hydroxide and insoluble calcium carbonate, (4) separating insolubles, (5) cycling insolubles to step (1), and (6) recovering mother liquor as kraft white liquor.

---

This is a continuation-in-part of application Ser. No. 453,043, filed May 4, 1965, now U.S. Patent No. 3,296,064, which in turn is a continuation-in-part of application Ser. No. 270,917, filed Apr. 5, 1963, and now abandoned.

This invention relates to the treatment of kraft black liquor, and more particularly concerns the recovery and reuse of cooking chemicals from the waste or black liquor from a kraft cellulosic pulping operation. The invention provides a system whereby separate causticizing plants heretofore required in conjunction with kraft black liquor processing are entirely eliminated.

The kraft process of converting natural cellulosic materials such as wood chips into pulp for the manufacture of paper and other cellulosic products essentially involves digestion of the chips with a cooking liquor containing sodium sulfide and sodium hydroxide. This liquor, termed white liquor, reacts with lignin, hemicelluloses, and other constituents of the wood to form a water soluble or dispersible mixture which, after removal of the cellulose pulp, is known as waste or black liquor.

In virtually all kraft pulp processing plants it is essential that the black liquor be processed for recovery of the active cooking chemicals. To this end, the black liquor is generally concentrated to about 45–70% total solids, and this concentrate is burned in a furnace or kiln to remove organic materials and to convert sodium sulfate (a process chemical make-up) to sodium sulfide by reduction with carbon. The molten or semi-fluid chemical smelt withdrawn from the furnace or kiln is dissolved in an aqueous solution to give a characteristic green liquor, after which the green liquor is causticized by adding slaked lime (calcium oxide) prepared from calcined limestone (calcium carbonate). In aqueous solution the slaked lime reacts with the sodium carbonate to form soluble sodium hydroxide and insoluble calcium carbonate. The latter is filtered off and then calcined in a lime kiln to recover the lime for reuse.

The resulting filtrate is the white liquor used in the kraft cooking process. It contains chiefly caustic soda and sodium sulfide, with smaller amounts of sodium carbonate, sodium sulfate, sodium sulfite, and sodium thiosulfate.

By reason of the fact that sodium compounds present in the smelt may consist of from 10 to about 80% or more of sodium carbonate, it is evident that on some occasions a substantial amount of lime is required for the causticizing plant to convert the sodium carbonate to sodium hydroxide. As a result, causticizing plants must have a large capacity, and are thus expensive in terms of both investment and operating costs.

Accordingly, an important object of the invention is to provide a kraft black liquor recovery process which eliminates the need for separate causticizing equipment.

A further object is to provide a process for recovering cooking chemicals from kraft black liquor whereby the need for concentrating the black liquor before heating or burning is substantially reduced, or even eliminated entirely.

Still another object is to simplify and reduce the investment and operating costs of plants for recovering kraft white (or cooking) liquor from black liquor.

Other and further objects, aims, and advantages of the invention will become apparent from the ensuing description which is to be read in conjunction with the attached drawings wherein:

FIGURE 1 is a schematic flow sheet depicting one embodiment of the invention;

FIG. 2 is an alternative embodiment which, when used in conjunction with the system of FIG. 1, permits the separation of a complex composed of calcium oxide, hydroxide, or carbonate and components of the black liquor;

FIG. 3 is an alternative embodiment utilizing acetone to facilitate the formation and separation of the separable complex; and FIG. 4 is yet another alternative embodiment employing the acetone system of FIG. 3, and wherein provisions are made for recovering organic by-products from a pulp manufacturing operation.

Briefly, in accordance with the invention, it has now been discovered that expensive and elaborate causticizing equipment in kraft waste liquor recovery processes may be eliminated entirely by adding to the black liquor (or to a concentrated black liquor) before burning, calcium oxide, hydroxide, and/or carbonate to provide, upon subsequent heating in the same furnace with black liquor, sufficient calcium oxide (or hydroxide) to convert the sodium carbonate formed in the burning operation to sodium hydroxide and calcium carbonate when the smelt is dissolved in an aqueous solution. The resultant calcium carbonate is separated along with excess slaked lime from the solution and recycled to the process. Thus, an important feature of the invention is that the furnace used to treat the black liquor serves simultaneously as a calcining furnace to reconvert the calcium carbonate to active calcium oxide.

An additional feature of the invention is the discovery that, under certain conditions, the calcium oxide, hydroxide, or carbonate forms a separable complex with the normally volatile components of the black liquor. As a consequence, the complex may be separated from the black liquor by physical means such as decanting, settling, centrifugation, or the like, which thereby greatly reduces or even eliminates the pre-existing need of concentrating the black liquor by evaporation.

As mentioned previously, sodium sulfide and hydroxide are the active pulping chemicals in the kraft pulping process. The proportion of these two chemicals is indicated by the term "sulphidity," which simply means the relationship between them, and may vary from a fraction of one percent to a fraction of a percent short of one hundred percent. Since the causticization step only involves the sodium hydroxide, the amount of lime required in this step varies considerably. Furthermore, this variation is aggravated by the use of different amounts of chemicals in the pulping operation. As a result, the actual amount of sodium hydroxide used varies widely. In the case where the total chemical charge is low and sulphidity is high, very small amounts of sodium hydroxide will be involved. In such a case, there may be insufficient amounts of calcium compounds present to efficiently form a separable complex. In order to make up this deficiency, magnesia may be used to serve this purpose. On the other hand, when an excessive amount of calcium compounds are required, as is the case when the total chemical charge is high and the sulphidity is low, it is advantageous to recycle some of these calcium compounds not required to form the separable complex to the feed of the dryer or directly to one of the other two zones of the furnace. This technique relieves the excessive load on some of the equipment such as the mixer, reaction chamber, clarifier, filter, etc.

Still another feature of the invention is associated with the recent discovery that acetone effects the separation of the volatile components of the black liquor when used alone or when in the presence of calcium oxide, hydroxide, or carbonate by forming a separable complex. Thus, the formation of a separable complex by the action of the acetone and then the physical separation of this complex from the black liquor further reduces the need for evaporative concentration of the liquor. Moreover, the acetone complex permits ready separation of organic components of the black liquor for the production of commercial products.

It has been found that isopropyl alcohol, tertiary butyl alcohol, and to a lesser extent ethyl alcohol may be used in place of acetone, or may be used in combination with each other or with acetone to effect the separation of some of the volatile components of the black liquor. Therefore, wherever the use of acetone is referred to, herein, it is understood that any one or combination of these alcohols or acetone may be used. The conventional practice of oxidizing the volatile sulfur compounds in the black liquor by treatment of oxygen-containing gases to avoid losses of these compounds in the evaporation and burning steps may be carried out in this process. However, except for embodiment No. 1, where there is no separation of a separable complex, it is desirable not to carry out this oxidation more than to oxidize the organic sulfur compounds such as mercaptans and methyl disulfide, so as to avoid the oxidation of sodium sulfide to sodium thiosulfate or sulfate. The purpose of restricting this oxidation, when a separation is not made, is to avoid a build-up of sodium thiosulfate and sulfate in the liquor system. When the separable complex is removed from the liquor for passage to the furnace, the sodium thiosulfate and sulfate present will not pass to the furnace for conversion to the active pulping chemical, sodium sulfide.

Turning first to FIG. 1, the drawing depicts schematically a simplified system for recovering cooking chemicals from kraft black liquor. The black liquor in this case is obtained from the kraft cooking of yellow pine chips, which are typically composed of about 50% cellulose fibers, about 30% lignin, about 16% other carbohydrates (e.g., hemicelluloses), about 3.3% resin and fats, and the remainder unidentified. During cooking, the lignin, carbohydrates, resin, and fats are dissolved by or reacted with cooking chemicals, or white liquor, to form the spent black liquor. An illustrative black liquor will contain, after the cooking process, about 12–20 weight percent of total solids, the remainder being almost entirely water, and will have an average density of about 11° Baumé at 60° F.

In the process shown in FIG. 1, the kraft black liquor is obtained from storage 11 and is first conducted to absorber 12, which is used to remove noxious hydrogen sulfide, mercaptans, methyl disulfides, etc. from the flue gases discharged from furnace 14. These gases, obtained from the dryer 15 connected to the furnace 14, are conducted via line 16 to a lower portion of the absorber 12, where they are contacted by a descending stream of kraft black liquor admitted near the top of the absorber 12. Gases discharging from absorber 12 via conduit 18 are free from hydrogen sulfide and other annoying gases, and may be vented directly to the atmosphere via conduit 18. The addition of controlled amounts of air to line 16 will oxidize the sulfur containing compounds in the black liquor as well as those in the flue gases.

Absorber 12 serves an additional function of reducing the pH of the normally highly alkaline kraft black liquor to within the range of about 7.5 to about 9.5, which has been found optimum in the event it is desired to form a separable complex between the calcium oxide, hydroxide, or carbonate and normally volatile components of the black liquor. Thus, depending on the concentration and amount of acidic gases, such as carbon dioxide, sulfur dioxide, hydrogen sulfide, etc. leaving furnace 14 via conduit 16, a portion (or all) of the black liquor may be by-passed around the absorber 12 so as to control the pH within the foregoing optimum range.

However if, as in the illustrative embodiment of FIG. 1, there is no separation of the calcium-containing complex, it is nonetheless desirable to lower the pH to the range of about 7.5 to 9.0 merely to prevent having too alkaline a condition in any of the downstream processing vessels. Furthermore, absorber 12 serves the additional purpose of recovering hydrogen sulfide and other sulfur containing gases from the furnace 14, so as to reduce the amount of make-up sulfur or sulfur-containing compounds.

The stream of treated black liquor leaving absorber 12 via conduit 19 is then conducted to a pair of multiple effect evaporators 20, 21, where water is removed under vacuum to concentrate the components of the black liquor to about 40–75 weight percent total solids, optimally about 45–60 weight percent total solids.

The strong black liquor leaving evaporator 21 via conduit 22 is then conducted to a mixer 24, where it is commingled with a stream of recycled calcium carbonate and some calcium hydroxide supplied via conduit 25. Recycle is added to mixer 24 via conduit 25, together with make-up calcium carbonate, oxide, or hydroxide in an amount sufficient to provide, upon subsequent burning and heating of the mixture in furnace 14, sufficient calcium oxide (or hydroxide) to convert the amount of the sodium carbonate formed in furnace 14 to sodium hydroxide and calcium carbonate in dissolver 39. For each mole of sodium carbonate obtained via the burning operation in furnace 14 there should, optimally, be one mole of calcium oxide, hydroxide, or carbonate added to the strong black liquor of conduit 32. Any excess calcium compound is not undesirable as it is filtered out of the regenerated kraft liquor and recycled back via conduit 25. Also, any deficiency of calcium compound results only in less effective regeneration. Additionally, it is generally found that calcination of calcium carbonate to calcium oxide in the furnace 14 proceeds almost quantitatively. Thus, for preliminary orientation, it is assumed that such calcination occurs quantitatively, with any adjustment in the minimum amount of calcium made thereafter to accommodate for insufficient calcination.

A stream of salt cake, i.e., sodium sulfate, is also added to mixer 24 via conduit 26 to allow for processing losses in the cooking steps and for any incidental sodium and sulfur losses in the waste liquor recovery process. In furnace 14, sodium sulfate reacts with carbon to form carbon dioxide and sodium sulfide, one of the active components of the kraft cooking liquor.

The stream leaving mixer 24 is conducted via valved conduit 28, valve 29 (and conduits 30, 31 in conjunction with the embodiment shown in FIG. 2) to the dryer 15. Dryer 15 desirably comprises an integral part of the furnace 14 and is depicted basically in FIG. 1. Into dryer 15, the stream of heavy black liquor and recycled calcium compounds is conveyed and permitted to descend against an ascending stream of hot furnace flue gases. The final concentration at the bottom of dryer 15 is approximately 45–90 weight percent total solids, at which concentration the heavy black liquor contains sufficient combustible organic material to sustain combustion when passed to the furnace 14.

As shown schematically in FIG. 1, the combination of dryer 15 and furnace 14 is connected by flue gas conduit 32, and provides essentially for a drying zone, a combustion zone and a reducing zone. The drying zone, defined by dryer 15, is a vertically elongated chamber into which heavy black liquor and recycled calcium compounds are conveyed via feeder 34, and down through which the mixture descends against a rising stream of hot flue gases, admitted via conduit 32. This dryer may take widely different forms to attain the same purpose. The gaseous effluent of dryer 15 is discharged from the dryer via conduit 16 near the top thereof.

The burning or combustion zone and the reducing zone of the furnace 14 are defined by the furnace 14 and, in the embodiment depicted in FIG. 1, by the upper and lower halves of the furnace 14. The upper half is supplied with combustion air via blower 35, and the lower or reducing zone supplied with controlled amounts of combustion air via blower 36. The black liquor and recycled calcium compounds discharged from the dryer 15 are conducted via a conduit 33 and fed into the upper or oxidizing zone of the furnace 14, where a stoichiometric excess of air supplied via blower 35 causes complete combustion of the organic constituents of the kraft black liquor, and thence, under reducing conditions, to effect the reduction of sodium sulfate to sodium sulfide. On some occasions it may prove advantageous to pass some, if not all, of the partially dried mixture in dryer 15 to the oxidizing zone via conduit 32.

Organic compounds in the black liquor are burned (or oxidized) in the oxidizing zone of furnace 14 and, as they descend in the furnace, are joined by the air supplied via blower 36 which causes further combustion in the reducing zone of the furnace. The furnace flue gases are then conducted via conduit 32 to the bottom of the dryer 15 countercurrent to the process stream.

Conditions maintained in the lower or reducing zone of the furnace 14 include a temperature sufficient to produce a semi-solid mixture or smelt of the kraft cooking chemicals collecting at the bottom of the furnace 14, and also to effect reduction of the sodium sulfate to sodium sulfide and calcination of the calcium carbonate to calcium oxide. The furnace 14 temperatures in the oxidizing zone desirably fall within the range of about 1400°–1900° F., optimally within the range of 1500°–1800° F., while in the reducing zone the temperatures are desirably within the range of about 1700°–2300° F., preferably within the range of about 1800°–2200° F. Under these conditions the desired chemical reactions occur, and the residue is in sufficiently semi-solid form to allow recovery thereof following dispersion in dissolver 39.

Alternative dryer-furnace combinations may be employed herewith, and in this respect attention is directed to the well-known Combustion Engineering Company dryer-furnace equipment and to the Babcock and Wilcox combination dryer and furnace, both of which are described in Shreve "Chemical Process Industries," pages 704–709 (McGraw-Hill, 1945). The furnace 14 may also be provided with steam generators for waste heat recovery, so that the ultimate temperature of the flue gas released from the dryer 15 via stack 16 must be at a temperature above the dew point to prevent condensation of the water present.

Additionally, it may be desirable under some circumstances to introduce a reducing gas into the lower or reducing zone of furnace 14 to further enhance the reduction of sodium sulfate to sodium sufide. Reducing gases such as hydrogen sulfide, carbon monoxide, methane, or the like are satisfactory for this purpose.

The chemicals which collect at the bottom of furnace 14 are, as before stated, in the form of a semi-solid mass or smelt, and are discharged via conduit 38 to dissolver 39. Here the mass is dispersed in an aqueous solvent, supplied via conduit 40, to induce reaction between the calcium oxide and the sodium carbonate to form sodium hydroxide and insoluble calcium carbonate.

The solvent supplied via conduit 40 may be water or any convenient stream available at the plant which is predominantly water and is free of substantial contaminants. Thus, this stream may comprise filtrate from the pulp washers (i.e., dilute black liquor), in which event effective utilization and reuse of a substantial amount of the water necessary for a pulp mill operation is achieved.

In any event, dissolver 39 produces a slurry containing the various salts and bases derived from the furnace 14, together with their inter-reaction products. Before inter-reaction occurs, the salts are chiefly sodium carbonate and sodium sulfide in a usual ratio of between about 2–4:1, with lesser amounts of sodium sulfite, sodium thiosulfate, sodium sulfate, etc., while the bases are mainly calcium oxide (or hydroxide) with a minor amount of sodium hydroxide.

A substantial amount of inter-reaction occurs in the dissolver 39, the principal reaction being double displacement between sodium carbonate and calcium hydroxide to form sodium hydroxide and insoluble calcium carbonate. If desired, the dissolver 39 may be sufficiently large to provide adequate residence time for this reaction to proceed to completion, but in the embodiment shown in FIG. 1 the dissolver 39 is of relatively small size, and a retention tank 41 connected to the dissolver 39 via conduit 42 is provided to afford sufficient residence time. The vapors evolved in dissolver 39 may be passed through a condenser (not shown) to remove water for reuse in the process, while the non-condensable gases, such as hydrogen sulfide, etc., may be passed to the furnace or a separate burner for destruction by burning and the resulting gases passed to line 16 for treatment.

The slurry in retention tank 41 is retained therein to permit the sodium carbonate-calcium hydroxide reaction to go substantially to completion. The resultant slurry is a mixture of cooking chemicals and insoluble calcium carbonate, together with any undissolved calcium hydroxide. Advantageously, the amount of water added via conduit 40 to the dissolver 39 was sufficient to provide the proper cooking chemical concentration so that the solution, after removal of insolubles, is suitable for use as kraft cooking liquor.

The slurry taken from the bottom of retention tank 41 via conduit 44 is then conducted to a continuous rotary filter 45, where undissolved calcium carbonate and any calcium hydroxide are separated as a predominately solids stream from the filtrate. The solids stream is thus available for recycle via conduit 25 to the mixer 24, while the filtrate is withdrawn via conduit 46 as kraft white liquor.

It is therefore apparent that the system of the invention provides a simple yet advantageous process for recovering cooking chemicals from kraft black liquor. It is particularly notable that, in contrast to conventional black liquor recovery processes, there is no need for a separate causticizing plant. Thus, this element of plant construction and maintenance cost is avoided entirely.

Another embodiment of the invention is depicted schematically in FIG. 2, which is to be taken in conjunction with the system of FIG. 1. The system of FIG. 2 provides further economies in a kraft black liquor recovery process in that it reduces the necessary amount of evaporation carried out by evaporators 20, 21 (FIG. 1) and, under appropriate conditions, may even eliminate the need for these evaporators.

The embodiment of FIG. 2 is based largely on the recognition that under certain circumstances a separable complex is formed between most of the normally volatile components of the black liquor and calcium oxide, hydroxide, or carbonate. Thus, by separating this complex from the black liquor by such physical separation techniques as settling, clarifying, filtration, centrifugation, or the use of hydrocyclones, the valuable constituents of the kraft black liquor may be recovered and some of the volatile components are destroyed by burning without the need for substantial evaporation of the water. Furthermore, unused pulping chemicals in the black liquor are recovered without having to be converted from the inactive pulping form, sodium carbonate, to sodium hydroxide by passing around the furnace in the mother liquor.

Conditions favorable to the formation of such a separable complex depend largely on the particular composition of kraft black liquor, which in turn depends on the composition of the wood chips and on the conditions existing in the wood chip digestors. It has been found, however, that a substantial excess of calcium compound, and a pH in the lower alkaline range, are generally conducive to separable complex formation. Thus, a pH above about 8.5 and up to about 10.0, and a calcium compound concentration of between about 10–80 weight percent of total normally non-volatile solids, will usually result in the formation of a separable solids complex.

When employing the embodiment of FIG. 2, the absorber 12 and the evaporators 20, 21 of FIG. 1 may be reduced in size or else eliminated entirely. In addition, valve 29 of FIG. 1 is closed to direct the stream leaving mixer 24 (FIG. 1) into conduit 30, indicated as A in both FIGS. 1 and 2. The returning stream from the system of FIG. 2 re-enters of the system of FIG. 1 via the conduit 31, shown as B.

Turning to FIG. 2, the mixture of black liquor and recycled calcium compounds is conducted as an aqueous slurry via conduit 30 to heated reaction chamber 48, where additional reaction is permitted to form the complex between calcium compounds and the normally volatile components of the black liquor. The consequent slurry is discharged from the bottom of the reaction chamber 48 and conducted via conduit 49 to a clarifier 50. After leaving reaction chamber 48, the stream may pass through the following types of equipment (not shown) to promote the separation of the separable complex; vacuum evaporator to cool and concentrate the stream and retention chests to provide adequate dwell (residence) time.

In the clarifier 50 a clarified aqueous solution is withdrawn near the top via conduit 51, while the thickened complex is withdrawn near the bottom via conduit 52. The stream leaving via conduit 51 contains sodium hydroxide and sulfide which may be recovered directly, while the stream leaving via conduit 52 contains most of the organic components and a minor proportion of the inorganic components of the black liquor. The thickened complex-containing stream of conduit 52 is conducted to a continuous filter 54, which removes additional water and provides a relatively dry complex. The additional water is discharged via conduit 55, which may be combined with the stream of conduit 51, while the main stream leaves filter 54 via conduit 31. From the conduit 31 it is returned to the system of FIG. 1, which operates as described previously. In this embodiment the make-up salt cake is added to line 34 or directly to the oxidizing or reducing zones of the furnace.

FIG. 3 depicts schematically an alternative embodiment of the invention which incorporates discoveries recently made by others to the effect that the addition of acetone causes the formation of a separable "complex" from the volatile components of the kraft black liquor. Such a complex is independent of the presence of calcium compounds, but in the embodiment of FIGURE 3, a separable double complex of the calcium compound-volatile component complex and the acetone-volatile component complex is employed.

The numbers on components in FIG. 3 have been assigned to facilitate easy reference to, and comparison with, corresponding elements in FIG. 1. An element or component in FIG. 3 that corresponds substantially to a similar element of FIG. 1 has been assigned a number that is one hundred more than the element of FIG. 1. Thus, for example, evaporator 20 of FIG. 1 has been designated as evaporator 120 of FIG. 3. Numbers in excess of 156 are without corresponding elements in FIG. 1.

Turning to FIG. 3, a kraft black liquor admitted from source 111 may first be conducted to an absorber, not shown, corresponding to absorber 12 in FIG. 1, and thence to a double effect evaporator 120, 121. These evaporators may be eliminated, but according to optimal practice are operated to provide a discharge stream via conduit 122 that is at least about 20% by weight of total solids.

The stream leaving the bottom of the evaporator 121 via the conduit 122 is conducted to an upper portion of acetone absorber 156, where it absorbs uncondensed acetone vapor admitted to the bottom of the absorber 156 via conduit 158; conduit 158 contains both vaporized and condensed acetone, as well as water and other components. An acetone-free stream is vented from acetone absorber 156 via conduit 159.

An alternative procedure to this phase of the process involves the use of a fraction-action column in line 158, so that the water present may be removed for reuse in the process and the acetone vapors alone are passed directly to acetone absorber 156.

In the acetone absorber 156 formation of a complex of the volatile components of the black liquor is initiated by the use of acetone. The extent of such complex formation will depend, of course, on the relative amount of acetone to volatile components and on the amount of water present, and also on the residence time in the obserber 156. At least a 1:1 ratio of acetone and black liquor is required to develop this complex with acetone alone.

The stream leaving the bottom of acetone absorber 156 conducted via valved line 160, provided with valve 161, to mixer 124, where it is commingled with a recycled calcium carbonate and hydroxide stream supplied via conduit 125. As in the case of the system of FIG. 1, the amount of calcium supplied via conduit 125 is sufficient to provide, after heating in the furnace 114, sufficient calcium oxide or hydroxide to convert a substantial amount, e.g., preferably more than half, of the sodium carbonate formed in the furnace 114 to sodium hydroxide (and calcium carbonate). It is noted that, in the embodiment of FIG. 3, make-up salt cake is not added to the mixer 24, but to line 172 or directly to the oxidizing or reducing zones of the furnace.

The slurry leaving mixer 124 via conduit 128 is conducted to a clarifier 162, which separates the complex, as a bottoms product discharged via conduit 164, from the mother liquor released via conduit 165 at the top of the clarifier 162. Alternatively, mixer 124 may advantageously precede acetone absorber 156.

The mother liquor of conduit 165 contains chiefly water and acetone, together with any dissolved salts, and is stripped of acetone in vacuum still 166, a plate-equipped stripping column provided with internal reflex. Acetone leaves vacuum still 166 as a vapor via conduit 168, where it proceeds via conduit 158 and a cooler 159 to the acetone absorber 156, described previously. The bottoms from vacuum still 166 is chiefly water containing dissolved salts, and is conducted via conduit 169 to the dissolver 139, where it constitutes all or a portion of the water used to form green liquor with the smelt 138 discharging from the furnace 114. In cases where bottoms in conduit 169 contain solids, these may be filtered by using a filter precoated with some of the recycled cycled calcium carbonate and hydroxide. The solids thus separated are passed to dryer 115.

Returning to clarifier 162, the complex released from the clarifier 162 via conduit 164 is conducted to a separate vacuum still 170, designed and operating similarly to that of vacuum still 166, where an acetone and water vapors stream is released via top conduit 171 and is conducted to conduit 158, while a bottoms acetone-free stream is discharged via conduit 172 to the dryer 115.

The dryer 115-furnace 114 of FIG. 3 operates similarly to that of dryer 15-furnace 14 of FIG. 1, with one exception. It is preferred, in the embodiment of FIG. 3, that flue gases discharging from the dryer 115 via conduit 116 be stripped of their hydrogen sulfide and/or sulfur dioxide content in an absorber 173 supplied with a soda ash or caustic soda solution via conduit 175. Absorber 173 is thus an effective alternate of absorber 12 of FIG. 1, although the arrangements are, in effect, interchangeable. The stream leaving the bottom of absorber 173, via conduit 176, is combined with the stream in conduit 172 containing heavy black liquor, and sent to the dryer 115. The use of absorber 173 avoids decreasing the alkalinity of the incoming black liquors.

Progress through the dryer 115, furnace 114, dissolver 139, retention tank 141, and filter 145 correspond to the operation of the equivalent elements in the system of FIG. 1.

It is evident, therefore, that the embodiment of FIG. 3 permits of substantial economies in evaporating and drying costs for the reason that these operations are applied to a separable complex rather than to an entire stream of volatile components dissolved or dispersed in a large amount of aqueous medium. Since evaporating and drying are normally expensive operations, the system of the invention not only effects economies by saving on these, but contributes to the net stream production of the waste liquor recovery process.

Turning now to FIG. 4, a further embodiment is illustrated which is used in conjunction with the embodiment of FIG. 3. In the FIG. 4 embodiment provisions are made for recovering organic by-products from a kraft pulping operation by processing the volatile components of the black liquor.

To conduct the system of FIG. 4, the valve 161 of FIG. 3 is closed and corresponding valves leading to conduits 178 or C, and from conduits 179 or D and 180 or E are opened.

In the system or embodiment of FIG. 4 a slurry or suspension of acetone-separated volatile components of the black liquor dispersed in the remaining black liquor is treated for the recovery of organic by-products. This is accomplished merely by concentrating the complex in clarifier 181, and transmitting the separated volatile components as a black viscous liquid via conduit 182 to a zone 184 for the recovery of organic by-products. After such recovery, the residue is returned to the system of FIG. 3 via conduit 180 or E, while the liquid fraction of material from conduit 178 is returned via conduit 179 of D, and processed in the normal manner. Make-up acetone is preferably added to the acetone absorber 156 or may be added at any point in the stream prior to vacuum stills 166 and 170.

The optimum pH for the formation of the volatile component complex by the action of acetone has been found to be about 13.5. As mentioned previously the incoming black liquor is not treated with the gases from dryer 115 to avoid lowering the pH. The optimum pH of 13.5 may advantageously be attained by adding sodium hydroxide for the sodium make-up, in which case the required sulfur make-up can be obtained by adding elemental sulfur to the pulping or white liquor prior to the pulping operation or directly to the pulp digesters. This addition of sodium and sulfur separately may be used to supplement or replace make-up salt cake.

Various modifications to the foregoing four embodiments will be evident from the above description. For example, all or a portion of the furnace flue gas may be sent to an absorber for contact with the original black liquor, or the absorber may be omitted entirely. Similarly, the black liquor may be concentrated by evaporation, or again this may be omitted. Whether such units are in fact employed depends largely on economic aspects, that is, a comparison of the costs of their installation and operation as opposed to the savings obtained by their use.

While the invention has been described in conjunction with specific embodiments thereof, it is evident that many alternatives, modifications, and variations will be suggested to those skilled in the art in light of the foregoing description. Accordingly, it is intended to embrace all such alternatives, modifications, and variations as fall within the spirit and broad scope of the appended claims.

I claim as my invention:

1. A process for recovering cooking chemicals from kraft black liquor, which black liquor contains the reaction products from cooking cellulosic materials with aqueous caustic and sodium sulfide, comprising:
    (1) adding to said black liquor a material selected from the group consisting of calcium oxide, hydroxide, and carbonate in an amount to provide (a) a pH above about 8.5, (b) a calcium compound concentration of between about 10–80 weight percent of normally non-volatile solids, and (c) after the heating step below, sufficient calcium oxide or hydroxide to thereafter convert a substantial amount of the sodium carbonate formed in said heating step to sodium hydroxide and calcium carbonate,
    (2)(a) heating said material and said reaction products in an oxidizing zone at a temperature within the range of about 1400–1900° F., under conditions effective to oxidize organic materials, and (b) further heating said material and said reaction products with a stoichiometric deficiency of air in a reducing zone at a temperature within the range of about 1700–2300° F., under conditions effective to (i) cause further combustion of organic materials, (ii) reduce sodium sulfate to sodium sulfide and (iii) calcine calcium carbonate to calcium oxide, and thereby form a smelt comprising chiefly sodium sulfide, calcium oxide, and sodium carbonate,
    (3) dispersing said smelt in an aqueous solvent to convert said calcium oxide and said sodium carbonate to sodium hydroxide and insoluble calcium carbonate,
    (4) separating insoluble calcium carbonate and any excess insoluble calcium hydroxide from the mother liquor,
    (5) cycling said separated calcium carbonate and any excess insoluble calcium hydroxide to step number (1) above, and
    (6) recovering mother liquor as kraft white liquor.

2. A process for recovering cooking chemicals from kraft black liquor, which black liquor contains the reaction products from cooking cellulosic material with aqueous caustic and sodium sulfide, comprising:
    (1) adding to said black liquor a material selected from the group consisting of calcium oxide, hydroxide, and carbonate in an amount to provide (a) a pH above about 8.5, (b) a calcium compound concentration of between about 10–80 weight percent of normally non-volatile solids, and (c) after the heating step below, sufficient calcium oxide or hydroxide to thereafter convert a substantial amount of the sodium carbonate formed in said heating step to sodium hydroxide and calcium carbonate,
    (2) heating said material and said reaction products under conditions effective to (a) oxidize organic materials under oxidizing conditions, (b) reduce sodium sulfate to sodium sulfide under reducing conditions, and (c) calcine calcium carbonate to calcium oxide, to thereby form a smelt comprising chiefly sodium sulfide, calcium oxide, and sodium carbonate,
    (3) dispersing said smelt in an aqueous solvent to convert said calcium oxide and said sodium carbonate to sodium hydroxide and insoluble calcium carbonate, (4) separating insoluble calcium carbonate and any excess insoluble calcium hydroxide from the mother liquor, (5) cycling said separated calcium carbonate and any excess insoluble calcium hydroxide to step number (1) above, and (6) recovering mother liquor as kraft white liquor.

3. Process of claim 2 including the step of separating a separable complex from the remaining black liquor and the step of subjecting said complex to said heating step number (2).

4. Process of claim 2 including the step of mixing acetone with said material and said black liquor to form a separable complex, separating said separable complex from the remaining black liquor, distillatively removing acetone from said separated complex, and subjecting the residue of said complex to said heating step number (2).

References Cited

UNITED STATES PATENTS

| | | | |
|---|---|---|---|
| 1,638,061 | 8/1927 | Rinman | 162—30 |
| 1,743,080 | 1/1930 | Bradley et al. | 162—16 |
| 2,034,833 | 3/1936 | Rinman | 162—30 |
| 2,774,666 | 12/1956 | Barton et al. | 162—31 |

FOREIGN PATENTS

| | | |
|---|---|---|
| 258,035 | 9/1926 | Great Britain. |
| 91,420 | 4/1958 | Norway. |

S. LEON BASHORE, *Primary Examiner.*